US007172799B2

(12) United States Patent
Petersen et al.

(10) Patent No.: US 7,172,799 B2
(45) Date of Patent: Feb. 6, 2007

(54) RADIATION FLOOD SOURCE AND METHOD FOR PRODUCING THE SAME

(75) Inventors: Horst Petersen, Braunschweig (DE); Helmut Menuhr, Braunschweig (DE)

(73) Assignee: AEA Technology QSA GmbH, Braunschweig (DE)

( * ) Notice: Subject to any disclaimer, the term of this patent is extended or adjusted under 35 U.S.C. 154(b) by 0 days.

(21) Appl. No.: 10/258,788

(22) PCT Filed: Apr. 25, 2001

(86) PCT No.: PCT/EP01/04691

§ 371 (c)(1),
(2), (4) Date: Dec. 18, 2002

(87) PCT Pub. No.: WO01/84560

PCT Pub. Date: Nov. 8, 2001

(65) Prior Publication Data

US 2003/0104178 A1 Jun. 5, 2003

(30) Foreign Application Priority Data

Apr. 28, 2000 (EP) .................................. 00109054

(51) Int. Cl.
*B32B 5/16* (2006.01)
*B41C 1/06* (2006.01)

(52) U.S. Cl. ..................... 428/66.5; 428/204; 428/207; 250/302; 250/303; 106/31.6; 101/34

(58) Field of Classification Search ............... 428/66.5, 428/76, 195.1, 201, 204, 207, 211.1, 535, 428/688, 916; 252/644; 106/31.13, 31.6; 250/302, 303; 101/34
See application file for complete search history.

(56) References Cited

U.S. PATENT DOCUMENTS 5,132,248 A 7/1992 Drummond et al.
6,740,875 B1 * 5/2004 Ishikawa et al. ............ 250/302

FOREIGN PATENT DOCUMENTS

| | | |
|---|---|---|
| JP | 62 192 472 | 8/1987 |
| JP | 101 43 775 | 5/1998 |
| WO | 99/62074 | 12/1999 |

OTHER PUBLICATIONS

T.R. Hebner et al., Ink-Jet Printing of Doped Polymers for Organic Light Emitting Devices, 1998, vol. 72, No. 5, Applied Physics Letters, American Institute of Physics, vol. 72, No. 5, Feb. 2, 1998, pp. 519-521, XP000737411.

* cited by examiner

*Primary Examiner*—Jennifer C. McNeil
*Assistant Examiner*—Aaron Austin
(74) *Attorney, Agent, or Firm*—Akerman Senterfitt; Stephan Pendorf; Yonghong Chen

(57) ABSTRACT

The invention relates to a process for producing a radiation flood source by printing a radioactive solution, and a radioactive printing solution used in this method. The present invention also relates to a flood source for quality testing and assurance of radiation detecting devices obtained by said process.

22 Claims, No Drawings

RADIATION FLOOD SOURCE AND METHOD FOR PRODUCING THE SAME

CROSS REFERENCE TO RELATED APPLICATION

This application is a national stage of PCT/EP01/04691 filed Apr. 25, 2001 and based upon EP 00109054.7 filed Apr. 28, 2000 under the International Convention.

The invention relates to a process for producing a radiation flood source by printing a radioactive solution, and a radioactive printing solution used in this method. The present invention also relates to a flood source for quality testing and assurance of radiation detecting devices obtained by said process.

BACKGROUND OF THE INVENTION

Modern medical diagnostic methods with radioactive substances rely on proper detection of emitted radiation or its absorption within a patient to whom such radioactive substances have been administered. Such detection is typically carried out with gamma-cameras or comparable devices.

Appropriately accurate detection in turn requires a constant quality testing and monitoring of the detection device or the gamma-camera itself. More in detail, the gamma-camera or detection device must allow for a homogeneous detection of emitted radioactivity over its entire surface. Inhomogenities in the detection itself will spoil or reduce the value of measurements in patients for diagnostic purposes.

Assessing quality and homogenity of a detection device is presently carried out with so-called "flood sources," or "radiation flood sources". These flood sources are large area (>10×10 $cm^2$) radiation sources, predominantly in form of flat foils or sheets. One example of a commercially available flood source is a plastic matrix in form of a circular flat sheet (diameter >30 cm) which contains the radionuclide of choice within the plastic sheet. However, these plastic matrices into which the respective nuclide or mixture of nuclides is incorporated typically do not allow for providing of a homogeneous radiation field, when analysed with a gamma-camera. Thus, the present technology of providing a flood source in form of a plastic sheet into which nuclides are incorporated requires extensive testing and scanning e.g. by use of photographic films as quality control of the flood source itself. Typically such product still provides for deviations of about 10% in the emitted radiation over its surface. Thus, the present products cannot exactly provide for a homogeneous radiation field.

Various methods have been proposed to achieve an improved radiation flood source. In particular evaporation and vapor phase deposition by distillation of some organic compounds has been proposed. The equipment required is somewhat complicated in that a vacuum system is necessary. It also has its limitations in the possibility of obtaining suitable organic compounds. The precipitation technique is very versatile for carrier quantities above 1 mg. The self-scattering and self-absorption factor is, however, large and in many cases difficult to estimate because filtered and dried samples tend to become quite uneven.

In cases where the amount of carrier is small (<1 mg) evaporation is a common method for source preparation. Samples prepared by this method often become very unevenly spread, however, with most of the material forming a ring. Addition of insulin, colloidal silica, or cupric ferrocyanide to the drop before evaporation improves the samples, but neither of these methods is satisfactory. Besides the addition of some solid compound is required, which will of course increase the self-scattering and self-absorption factor.

A further method which has been proposed in literature is the electrospraying of radionuclides (see E. Brunix and G. Rudstam in: Nuclear Instruments and Methods 13 (1961) p. 131–140). This method requires an electrically conducting substrate and electrically charged nuclides. The nuclides migrate between a first electrode in solution through the nozzle of a pipette to the substrate, functioning as a second electrode. Typically the electrospraying therefore has the disadvantage that only electrically conducing substrates can be coated, the coated area is small and the equipment used is very expensive.

Another method of depositing a radioactive coating on a substrate, in this case a brachytherapy device is disclosed in WO 99/62 074. The document teaches printing of a radioactive fluid by use of the conventional inkjet technology and curing the printing fluid to obtain the final coating. Due to the intended substrate of a brachytherapy device or seed, the printing process disclosed in WO 99/62 074 is concerned with small dimensions.

The printing fluid used in the above process is stated to comprise the nuclide, preferably selected from Pd-103, I-125, Au-198, Au-199, Y-90, P-32, Ir-192, and Am 241, or a precursor thereof, a solvent and a curable binder to retain the nuclide within the coating. The printing fluid, which is deliberately not called an ink, is not intended to be viewed as a black or coloured ink and all corresponding examples lack an ink as a possible constituent of the printing fluid. To nevertheless allow for printing of the fluid WO 99/62 074 teaches that specific requirements (viscosity, charge etc.) must be met by the printing fluid disclosed. This in turn requires careful preparation of the printing fluid.

It is the object of the present invention to provide a radiation flood source having a homogeneous or controlled inhomogeneous radiation field. It is further an object of the invention to provide for a simple and inexpensive method of manufacture for such homogeneous radiation flood source which method further allows to omit the extensive quality testing and scanning necessary with current flood sources, and also avoids cumbersome and costly preparation of a printing fluid.

SUMMARY OF THE INVENTION

In a first aspect the present invention relates to a process for producing a radiation flood source comprising a flat substrate having printed on at least on surface thereof a radioactive coating comprising a radioactive material selected from an $\alpha$-, $\beta$- and/or $\gamma$-emitting nuclide or their mixtures and an ink, which coating provides for a homogeneous or controlled inhomogeneous radiation field, said process comprising:

homogeneously dissolving or dispersing the radioactive material in a suitable solvent and mixing of the thus obtained solution with an ink or directly dissolving or dispersing the radioactive material in an ink, optionally diluted with a suitable solvent, to obtain a radioactive printing solution, and printing this radioactive printing solution on the at least one surface of the substrate to provide the desired homogeneous or controlled inhomogeneous radioactive pattern by using an ink jet printer.

According to another aspect the present invention relates to a radiation flood source comprising a flat substrate having printed on at least one surface thereof a radioactive coating, which coating comprises a radioactive material selected from an α-, β- and/or γ-emitting nuclide or a mixture of such nuclides and an ink, which coating provides for a homogeneous or controlled inhomogeneous radiation field. This radiation flood source may further comprise a protective coating. This protective coating even more preferably seals the substrate and its radioactive coating.

In another aspect the present invention relates to radioactive printing solution comprising (i) an α-, β- and/or γ-emitting nuclide or mixtures of said nuclides in form of a salt, a complex or an organic compound, (ii) an ink and (iii) optionally a suitable solvent for dissolving or dispersing said nuclide(s).

DETAILED DESCRIPTION OF THE INVENTION

According to a first aspect thereof the present invention relates to a radiation flood source comprising a flat substrate having printed on at least on surface thereof a radioactive coating comprising a radioactive material selected from an α-, β- and/or γ-emitting nuclide or their mixtures and an ink, which coating provides for a homogeneous or controlled inhomogeneous radiation field, said process comprising:

- homogeneously dissolving or dispersing the radioactive material in a suitable solvent and mixing of the thus obtained solution with an ink or directly dissolving or dispersing the radioactive material in an ink, optionally diluted with a suitable solvent, to obtain a radioactive printing solution, and
- printing this radioactive printing solution on the at least one surface of the substrate to provide the desired homogeneous or controlled inhomogeneous radioactive pattern by using an ink jet printer.

In its second aspect the invention relates to a radiation flood source comprising a flat substrate having printed on at least one surface thereof a radioactive coating, which coating comprises a radioactive material selected from an α-, β- and/or γ-emitting nuclide or a mixture of such nuclides and an ink, which coating provides for a homogeneous or controlled inhomogeneous radiation field, which radiation flood source is preferably obtained according to the above process of the invention.

The expression "homogeneous" as used herein is intended to define a radiation field in a plane parallel to the coated surface which field does not or not substantially change within this plane. A change or deviation within 0 to 5% standard deviation is considered homogeneous.

The term "controlled inhomogeneous" as used herein is intended to define a pattern, wherein the emitted radiation or the radiation field changes in a controlled and desired manner within the plane parallel to the surface of the substrate. For example, controlled inhomogenity could be in form of an emission gradient, in form of a regular pattern (circles, spots, squares etc.) or in form of any other desired irregular pattern i. g. a pattern mimicking at least part of the body of a patient or his limbs, flanked by non-emitting areas of the surface.

A radiation flood source of this invention comprises a substrate which, although it can in general be of any desired shape, provides at least one flat surface and is preferably flat in general. The expression "flat" as used herein is intended to refer to a substantially extended surface in a single plane and preferably refers to a body having two such surfaces with a third dimension which is comparatively small over the other two dimensions. A preferred example of a flat substrate is a sheet or a foil such as an $Al_2O_3$ sheet or a copier foil.

The substrate can be made from any suitable material. Preferred are electrically not conducting materials. The material may for example be selected from the group consisting of paper; laminated or coated paper; board; photo paper; plastics such as polyester, polyether, polyurethane, polyethylene, polypropylene, polyvinylalcohole, polyvinylether, polyvinylester, polyvinylidene chloride, polyvinylchloride, polystyrole, acrylic acid and methacrylic acid homo- and copolymers, polycarbonate, polyamide, polyimide or polyethylene terephthalate or their mixtures; cotton; silk; cellulosic materials such as nitrocellulose; metals; metal oxides and alloys; and mixtures thereof. Preferably the substrate of the radiation flood source of the invention is made from a flexible material in form of a sheet or foil made of paper, polyester, polyvinylalcohole, polyethylene, nylon, polyamide, polyimide, such as commercially available copier foils, metal oxides, such as $Al_2O_3$, cotton or silk.

The radioactive coating of the radiation flood source of the invention comprises a radioactive material selected from an α-, β- and/or γ-emitting nuclide or a mixture of such nuclides. Preferred examples of such nuclides are those selected from the group consisting of Co-57, Ba133, Gd-153, C-14, P-33, Tc-99, and their mixtures, although in general all known nuclides may be used, depending on the precise purpose the radiation flood source is used for.

The coating further comprises an ink, preferably a colored ink. More preferably the ink is not a black ink (carbon black comprising ink). By incorporation of the ink several advantages can be achieved. These include:

(1) The ink may be chosen according to the printing device used. Thereby the ink already ensures printability of the radioactive printing solution.

(2) Choice of a commercially available ink allows for simplification of the preparation of the printing fluid.

(3) The radioactive coating itself becomes visible on the substrate. This allows e.g. for color coding of the respective nuclides or nuclide mixtures within the coating. It also allows for visualisation of the shape of the coating e.g. in form of a circle, square or other irregular pattern, or of an activity gradient visualised by a color shading within the coating e.g. from one side to the other or from center to circumference thereof.

(4) The incorporation of ink finally assists in watching contamination of substrates, devices etc. visually.

Incorporation of the ink requires, however, compatibility of ink and nuclide(s). Especially, the ink must be sufficiently resistant to the emitted radiation to not substantially degrade its printability and/or color. In this respect the above nuclides are especially preferred in view of the emitted radiation (initial dose, energy, etc.).

The radiation dose coated on the substrate in generally depends on the purpose, the flood source is used for. However, preferably this dose is in a range of $10^{-6}$ to $10^{2}$ GBq/m$^2$ more preferably $10^{-4}$ to 10 GBq/m$^2$ and even more preferable 0.001 to 0.5 GBq/m$^2$.

The radiation flood source of the present invention may in general have any desired shape and dimensions, although circular or rectangular (e.g. DIN A4), especially quadratic shapes of flat substrates are preferred. A circular shape may have a diameter of for example in between 0,1 to 2 m, preferably 0,5 to 1 m, whereas square dimensions of 0,1 m×0,1 m to 2 m×2 m, preferably 1 m×1 m will in general be sufficient for medical purposes. Larger dimensions can be obtained by printing smaller parts, combining the same and, optionally, cutting to final dimensions. With respect to the possibility of using commercially available printers, a DIN A4 format or a corresponding US format of the substrate is preferred, which does not exclude combining of two or more of the printed substrates to form the final flood source.

The radiation flood source of the present invention may further comprise a protective coating on at least the surface bearing the radioactive coating. The protective coating comprises any radiation transmitting, but radiation resistant material desired. Preferably the protective coating comprises a plastic material selected from the group consisting of polyester, polyether, polyurethane, polyethylene, polypropylene, polyvinylalcohole, polyvinylether, polyvinylester, polyvinylidene chloride, polyvinylchloride, polystyrole, acrylic acid and methacrylic acid homo- and copolymers, polycarbonate, polyamide, polyimide and polyethylene terephthalate or their mixtures or a metal such as Al or Ti and metal alloys or oxides thereof. Even more preferably, in case of a flat substrate this is provided with such protective coating on its top and bottom surface. The edges of the substrate may further be sealed with any of the above plastic materials, e.g. by joining top and bottom coatings extending beyond the substrate directly or by providing a separate edge sealing.

On the first protective coating a second protective coating may be applied. This second protective coating is preferably made from the same material as listed above. It can be of larger dimensions than the first protective coating and/or the substrate. It may also function to seal the flood source, or may allow to add or fix a label, handle etc. for example.

The radiation flood source can be obtained by the above process of the invention, which is described in detail in the following. Most importantly, in said process the radioactive coating of the at least one surface of the flat substrate is deposited out by printing a radioactive printing solution on said substrate.

The printing step is carried out by using a commercially available ink jet printing device. Said printing device may e.g. be a commercially available ink jet printer. Ink jet printing in generally may involve one of four processes, namely continuos-jet-printing, intermittent-jet-printing, impulse-jet-printing, and compound-jet-printing. All of these processes are well known in the art. They in principle rely on pressure to eject small droplets of ink out of nozzle on the printing substrate. Therefore, none of these techniques requires an electrically conducting substrate. The devices are comparatively simple and are commercially available e.g. from Hewlett Packard, Kodak, Xerox, Ricoh and others.

The radioactive solution to be printed on the substrate (preferably a sheet or foil) is filled into an empty cartridge of the device such as the cartridge of a commercially available ink jet printer. This is typically effected in a shielded box. The cartridge is then installed in the printer and a usual printing process is carried out. Printing can be controlled via a normal PC using commercially available software to print the previously defined patterns. Preferably, the cartridge is only filled to an extend that a single coating or printing operation can be carried out and is sufficient to empty the cartridge. A single cartridge can, however, be used several times provided it is properly cleaned and handled in between.

Printing allows applying of a uniform coating to the substrate. Given the uniform or homogeneous dissolution or dispersion of the nuclide in the printing solution this results reliably in a homogeneous distribution of nuclides in the coating and thus a homogeneous radiation field.

Printing or coating of patterns e.g. by leaving blank or uncoated areas between coated patterns allows to introduce controlled inhomogenities into the radiation field. Else such controlled inhomogenities could be introduced by thickening the coating in predetermined areas e.g. by repeating the printing/coating process for a desired pattern. This likewise allows for obtaining an activity gradient, visualised by a color shading.

The method of the invention may further, if necessary, comprise an additional step of drying the substrate. Likewise it is possible to repeat the printing process to e.g. partially or totally thicken the coating, add a second coating comprising the same and/or another nuclide or mixture thereof, etc.

The method of the invention may further comprise a step of applying at least one protective coating to at least part of the substrate's surface. This coating is preferably at least provided on the surface bearing the printed radioactive coated pattern, preferably sealing this pattern, more preferably sealing the entire surface and most preferably the entire substrate. Such protective coating may be made from the plastic materials as listed above. The coating may be applied by any suitable technique such as dipping, spraying, calandering, painting a coating solution or preferably by laminating a foil of said coating material. Lamination can be achieved by simply gluing the foil on the substrate (cold lamination) or heating up the foil just under its melting point and then pressing the parts together (hot lamination).

In any case providing a protective coating and especially lamination is to be understood as covering a printed pattern with a coating such as a thin film or foil of the above plastic or metallic material to protect the surface against abrasion or any other interference resulting in poor quality. The coating material must allow transmission of the radiation emitted by the nuclide(s) and must be radiation resistant in that the emitted radiation does not substantially alter its properties or degrade the material itself.

The protective coating may be provided on one or more surfaces of the radiation flood source. Preferably, in case of a sheet or foil as the substrate the protective coating is provided on the top and bottom surface thereof. A second lamination can be carried out to seal the edges as well. Further, this sealing can also be effected by providing a second coating on the first protective coating having larger dimensions than the radiation flood source itself and sealing e. g. by laminating the top and bottom parts of said second coating to form a seal. In any case a tag can be provided within the source (between first and second coating, between substrate and coating or between the top and bottom part of the coating having larger dimensions) to attach information about the source directly thereto. This bears the advantage that the source can be marked to indicate a certain product and to make the source itself traceable. The second coating may also provide for other handling means such as means for holding or fixing the flood source.

The process according to the invention may further comprise a step of cutting or punching out the substrate to the desired size and/or shape by methods known per se. For example, several smaller rectangular printing patterns can be printed, punched out and put together to provide a larger radiation flood source. Punching or cutting out maybe preferably applied only after providing the first protective coating, which avoids contamination of the cutting or punching device by the nuclide leaching from the radioactive coating.

According to another embodiment the process of printing the radioactive solution or dispersion is carried out on a used or older reaction flood source having reduced radioactivity due to the time elapsed since its original manufacture. This allows to re-increase its emitted radiation and thus its re-use with a smaller amount of activity than required for new sources.

For these used radiation flood sources, which would otherwise have to be disposed off, printing of a second or following coating allows to restore or re-increase their radioactivity to once again provide a radiation flood source ready to use. Thereby the process of the invention effectively allows for a recycling of the radiation flood sources. Especially in the field of nuclear subject-matter this results in a considerable reduction of waste to be taken care of.

In a third aspect the invention relates to a radioactive printing solution comprising an α-, β- and/or γ-emitting nuclide or mixtures of said nuclides in form of a salt, a complex or an organic compound, an ink and optionally a suitable solvent for dissolving or dispersing said nuclide(s). The radioactive printing solution is obtained by (i) dissolving or dispersing the nuclide or nuclide mixture in a suitable solvent and mixing the obtained radioactive solution with the ink or (ii) by directly dissolving or dispersing the nuclide or nuclide mixture in the ink, optionally diluted with the suitable solvent. Preferably the nuclide is present in form of its salt, a complex or an organic compound thereof. Preferable nuclides are the ones listed above for the radiation flood source of the innovation.

Some nuclides such as Co, Ba, and Gd may be used in form of their cations in combination with anions such as chloride, nitrate or sulphate. The choice of anion depends on the respective nuclide, and anions providing better water solubility are preferred. More in detail the anion should provide for a sufficient water solubility without changing the pH of the ink-solution.

Other nuclides such as phosphorus (P-32) or technetium maybe used in form of their anions. In this case the choice of the respective cations is equally made according to water solubility of the respective salt. The above nuclides and especially C may as well be used in form of organic compounds, for C for example in form of sugars or amino acids.

The preferred solvent to provide a homogeneous radioactive solution or dispersion of the nuclide(s) is a polar solvent or a mixture of such solvents. Preferably the polar solvent is selected from the group consisting of water, alkoholes, ethers, esters, ketones, aldehydes and mixtures thereof. Even more preferably the solvent is water or mixture of water and another solvent. Depending on the precise nuclide(s) and the form of compounds, salts or complexes it is provided in, a non-aqueous-solvent may also be used. In the printing applications for producing the radiation flood source of the invention, aqueous-solvents or solvent mixtures are preferred.

Choice of the respective solvent(s) is typically adjusted to the precise printing technique intended and the chosen nucleotide. In addition the solvent must be compatible with the ink, with which it is admixed to obtain the radioactive printing solution of the invention, in that it does not substantially deteriorate its printing properties.

The radioactive printing solution comprises the nuclide, optionally a solvent and an ink, preferably a commercially available ink, even more preferably colored inks comprising no carbon black. This "ink", which term encompasses any equivalent colored printing solution, should be suitable for the printing device chosen, and the solution or dispersion of the nuclide and the solvent should be chosen such that properties of the ink and the cartridge are not altered. When using a usual ink jet printer and a respective, commercially available ink, it is preferred to allow for a neutral pH of the solution to be mixed with the ink to avoid deterioration of properties. Preferred inks are those commercially available from HP under the tradenames "HP Tintenpatrone", "HP Tintensystem", "HP UV-Tintensystem CP", from Kodak under the tradenames "Kodak 1000 Tintenpatrone", "EL Standard Dye InkJet Tinte", "PF Pigmenttinte", or from Encad under the tradenames "GS Tinte NJ PRO", "GA Tinte NJ PRO", and "GO Tinte NJ PRO".

The radioactive solution of the invention is obtained either by first dissolving or dispersing the nuclide or nuclide mixture in the above suitable solvent. In case of the nuclide being used in form of a water soluble salt, this can be carried out by simply adding the nuclide salt to the aqueous solvent or solvent mixture. The obtained radioactive solution is then admixed with the ink by known means. Typically all mixing steps are carried out in a shielding box. Alternatively the solid nuclide may be directly dissolved or dispersed in the ink, which may optionally be diluted beforehand or thereafter with the above suitable solvent(s).

Although in general any mixing ratio is suitable as long as the properties of the ink are not substantially changed to provide for a proper printing process, a preferred mixing ratio is from 0 to less than 100 Vol.-% of radioactive solution and more than 0 to 100 Vol.-% of ink, more preferably 0,5–50 Vol.-% radioactive solution to 50–99,5 Vol.-% ink, most preferably 0.5–10 Vol.-% solution and 90–99,5 Vol.-% ink. The amount of nuclide within the radioactive printing solution is typically chosen such that sufficient nuclide salt or nuclide compound is provided to allow for a sufficient radiation dose to provide after printing of at maximum the cartidge content the desired radiation doses per $m^2$ of surface coated.

The present invention thus allows to obtain by way of a very simple, economic process, which can be easily installed and requires only minimal equipment, a homogenous or intentionally inhomogeneous radiation flood source for use in quality monitoring of radiation detecting device. The process of the invention further allows a recycling of the flood sources used.

The invention will be illustrated by the following examples which are not intended to limit the scope of protection.

EXAMPLE 1

In the first step a radioactive printing solution was prepared by dissolving Gd-153 nitrate in water to provide for 60 GBq Gd-153 per ml. 0.1 ml of this solution were added to 9.9 ml ink (Encad: GS Tinte magneta NJ PRO 600e) and carefully mixed.

The final solution was filled into an empty cartridge of an ink jet printer (Encad Nova Jet 630) and 0.1 ml thereof printed on a commercially available copier foil to yield a 10×10 cm square source of about $6\times10^{-4}$ GBq/$cm^2$ (6 GBq/$m^2$).

EXAMPLE 2

Example 1 was repeated except that an aqueous solution of Gd-153 nitrate (0.6 GBq/ml) was used as the printing solution.

EXAMPLE 3

Example 1 was repeated except that the solid Gd-153 nitrate was dissolved in the ink directly and the radioactive ink thus obtained was used as the printing solution.

What is claimed is:

1. A radiation flood source comprising a flat substrate having printed on at least one surface thereof a radioactive coating, which coating comprises an ink and a radioactive material selected from at least one of an α-, β- and γ-emitting nuclide selected from the group consisting of Co-57, Ba-133, Gd-153, C-14, P-33, Te-99 and mixtures thereof, which coating provides for a homogeneous or controlled inhomogeneous radiation field as evidenced by a homogeneous or controlled inhomogeneous ink pattern.

2. The radiation source of claim 1, wherein the substrate is made from a material selected from the group consisting of paper; laminated or coated paper; board; photo paper; plastics such as polyester, polyether, polyurethane, polyethylene, polypropylene, polyvinylalcohole, polyvinylether, polyvinylester, polyvinylidene chloride, polyvinylchloride, polystyrole, acrylic acid and methacrylic acid homo- and copolymers, polycarbonate, polyamide, polyimide or polyethylene terephthalate or their mixtures; cotton; silk; cellulosic materials such as nitrocellulose; metals, metal oxides or alloys and mixtures thereof.

3. The radiation source of claim 2, wherein the substrate is a used radiation flood source comprising a flat substrate having printed on at least one surface thereof a radioactive coating, which coaxing comprises an ink and a radioactive material selected from at least one of an α-, β- and γ-emitting nuclide selected from the group consisting of Co-57, Ba-133, Gd-153, C-14, P-33, Te-99 and mixtures thereof, which coating provides for a homogeneous or controlled inhomogeneous radiation field as evidenced by a homogeneous or controlled inhomogeneous ink pattern.

4. The radiation flood source of claim 1, further comprising a protective coating.

5. A radiation flood source according to claim 1, obtained by a process comprising:

homogeneously dissolving the radioactive material in a suitable solvent and mixing of the thus obtained solution with an ink or directly dissolving or dispersing the radioactive material in an ink, optionally diluted with a suitable solvent to obtain a radioactive printing solution, and printing this radioactive printing solution on the at least one surface of the substrate to provide the desired homogeneous or controlled inhomogeneous radioactive pattern by using an ink jet printer.

6. The radiation flood source of claim 1, wherein the substrate is a sheet or foil.

7. The radiation flood source of claim 6, wherein the substrate has circular shape with a diameter of 0.1 to 2 m.

8. The radiation flood source of claim 6, wherein the substrate has square shape with dimensions of $0.1 \times 0.1\ m^2$ to $2.0 \times 2.0\ m^2$.

9. The radiation flood source of claim 8, wherein the substrate has DIN A4 format.

10. A radioactive printing solution comprising at least one of an α-, β- and γ-emitting nuclide selected from the group consisting of Co-57, Ba-133, Gd-153, C-14, P-33, Te-99 and mixtures thereof or mixtures of said nuclides in a form selected from the group consisting of a salt, a complex or an organic compound; an ink; and optionally a suitable solvent for dissolving said nuclide(s).

11. The radioactive printing solution of claim 10 obtained by (i) dissolving the nuclide or nuclide mixture in a suitable solvent and mixing the obtained radioactive solution with the ink or (ii) by directly dissolving the nuclide or nuclide mixture in the ink, optionally diluted with the suitable solvent.

12. The radioactive printing solution of claim 10, comprising more than 0 to less than 100 Vol.-% of the radioactive printing solution and more than 0 to 100 Vol.-% of ink.

13. The radioactive printing solution of claim 10, comprising 0.5 to 50 Vol.-% of radioactive printing solution and 50 to 99.5 Vol.-% ink.

14. A process for producing a radiation flood source comprising a flat substrate having printed on at least one surface thereof a radioactive coating comprising a radioactive material selected from at least one of an α-, β- and γ-emitting nuclide selected from the group consisting of Co-57, Ba-133, Gd-153, C-14, P-33, Te-99 and mixtures thereof, which coating provides for a homogeneous or controlled inhomogeneous radiation field, said process comprising:

homogeneously dissolving the radioactive material in a suitable solvent and mixing of the thus obtained solution with an ink or directly dissolving the radioactive material in an ink, optionally diluted with a suitable solvent, to obtain a radioactive printing solution, printing this radioactive printing solution on the at least one surface of the substrate to provide the desired homogeneous or controlled inhomogeneous radioactive pattern by using an ink jet printer, wherein the radioactive material is in form of a salt, complex or an organic compound comprising the same.

15. A process for producing a radiation flood source comprising a flat substrate having printed on at least one surface thereof a radioactive coating comprising a radioactive material selected from at least one of an α-, β- and γ-emitting nuclide selected from the group consisting of Co-57, Ba-133, Gd-153, C-14, P-33, Te-99 and mixtures thereof, which coating provides for a homogeneous or controlled inhomogeneous radiation field, said process comprising:

homogeneously dissolving the radioactive material in a suitable solvent and mixing of the thus obtained solution with an ink or directly dissolving the radioactive material in an ink, optionally diluted with a suitable solvent, to obtain a radioactive printing solution, printing this radioactive printing solution on the at least one surface of the substrate to provide the desired homogeneous or controlled inhomogeneous radioactive pattern by using an ink jet printer, wherein said solvent is a polar solvent selected from the group consisting of water, alcohols, ethers, esters, ketones, aldehydes and mixtures thereof.

16. A process for producing a radiation flood source comprising a flat substrate having printed on at least one surface thereof a radioactive coating comprising a radioactive material selected from at least one of an α- β- and γ-emitting nuclide selected from the group consisting of Co-57, Ba-133, Gd-153, C-14, P-33, Te-99 and mixtures thereof, which coating provides for a homogeneous or controlled inhomogeneous radiation field, said process comprising:

homogeneously dissolving the radioactive material in a suitable solvent and mixing of the thus obtained solution with an ink or directly dissolving the radioactive material in an ink, optionally diluted with a suitable solvent, to obtain radioactive printing solution, printing this radioactive printing solution on the at least one surface of the substrate to provide the desired homogeneous or controlled inhomogeneous radioactive pattern by using an ink jet printer, and drying the coating.

17. A process for producing a radiation flood source comprising a flat substrate having printed on at least one surface thereof a radioactive coating comprising a radioactive material selected from at least one of an α- β- and γ-emitting nuclide selected from the group consisting of Co-57, Ba-133, Gd-153, C-14, P-33, Te-99 and mixtures thereof, which coating provides for a homogeneous or controlled inhomogeneous radiation field, said process comprising:

homogeneously dissolving the radioactive material in a suitable solvent and mixing of the thus obtained solution with an ink or directly dissolving the radioactive material in an ink, optionally diluted with a suitable solvent, to obtain a radioactive printing solution, printing this radioactive printing solution on the at least one surface of the substrate to provide the desired homogeneous or controlled inhomogeneous radioactive pattern by using an ink jet printer, and cutting or punching out the substrate to the desired size and/or shape.

18. A process for producing a radiation flood source comprising a flat substrate having printed on at least one surface thereof a radioactive coating comprising a radioactive material selected from at least one of an α-, β- and γ-emitting nuclide selected from the group consisting of Co-57, Ba-133, Gd-153, C-14, P-33, Te-99 and mixtures thereof, which coating provides for a homogeneous or controlled inhomogeneous radiation field, said process comprising:

homogeneously dissolving the radioactive material in a suitable solvent and mixing of the thus obtained solution with an ink or directly dissolving the radioactive material in an ink, optionally diluted with a suitable solvent, to obtain a radioactive printing solution, printing this radioactive printing solution on the at least one surface of the substrate to provide the desired homogeneous or controlled inhomogeneous radioactive pattern by using an ink jet printer, wherein the substrate is a used radiation flood source and a second radioactive coating is primed thereon to re-increase radioactivity of the entire source for reuse.

19. A process for producing a radiation flood source comprising a flat substrate having printed on at least one surface thereof a radioactive coating comprising a radioactive material selected from at least one of an α-, β- and γ-emitting nuclide selected from the group consisting of Co-57, Ba-133, Gd-153, C-14, P-33, Te-99 and mixtures thereof, which coating provides for a homogeneous or controlled inhomogeneous radiation field, said process comprising:

homogeneously dissolving the radioactive material in a suitable solvent and mixing of the thus obtained solution with an ink or directly dissolving the radioactive material in an ink, optionally diluted with a suitable solvent, to obtain a radioactive printing solution, printing this radioactive printing solution on the at least one surface of the substrate to provide the desired homogeneous or controlled inhomogeneous radioactive pattern by using an ink jet printer, wherein after printing of the radioactive solution at least one protective coating is applied on at least part of the surface thereof.

20. The process of claim 19, wherein the protective coating is provided before cutting or punching out the substrate.

21. The process of claim 19, wherein the protective coating is provided by laminating a foil or sheet of the coating material.

22. The process of claim 19, wherein the protective coating seals the substrate.

* * * * *